(12) United States Patent
Xiao

(10) Patent No.: US 8,127,347 B2
(45) Date of Patent: Feb. 28, 2012

(54) VIRTUAL FIREWALL

(75) Inventor: Hisky Xiao, Wuhan (CN)

(73) Assignee: 02Micro International Limited, Grand Cayman (KY)

( * ) Notice: Subject to any disclaimer, the term of this patent is extended or adjusted under 35 U.S.C. 154(b) by 1024 days.

(21) Appl. No.: 11/648,097

(22) Filed: Dec. 29, 2006

(65) Prior Publication Data

US 2008/0163357 A1    Jul. 3, 2008

(51) Int. Cl.
    H04L 29/06    (2006.01)
(52) U.S. Cl. .............. 726/11; 726/1; 726/3; 726/15; 713/153; 713/154; 709/229; 709/249
(58) Field of Classification Search .......... 726/1, 3, 726/11, 15; 713/153, 154; 709/229, 249
    See application file for complete search history.

(56) References Cited

U.S. PATENT DOCUMENTS

| | | | |
|---|---|---|---|
| 5,950,195 A * | 9/1999 | Stockwell et al. ............... 707/4 |
| 6,202,081 B1 * | 3/2001 | Naudus ........................... 709/200 |
| 6,772,347 B1 * | 8/2004 | Xie et al. ....................... 726/11 |
| 2001/0039593 A1 * | 11/2001 | Hariu ............................ 709/249 |
| 2003/0200463 A1 * | 10/2003 | McCabe ......................... 713/201 |
| 2004/0088542 A1 * | 5/2004 | Daude et al. ................... 713/156 |
| 2005/0114704 A1 * | 5/2005 | Swander ......................... 713/201 |
| 2005/0268334 A1 * | 12/2005 | Hesselink et al. ............... 726/11 |
| 2006/0005236 A1 * | 1/2006 | Wesinger et al. ................ 726/11 |
| 2006/0143699 A1 * | 6/2006 | Nagata et al. .................... 726/11 |
| 2006/0156403 A1 * | 7/2006 | Haeffele et al. ................. 726/23 |
| 2007/0261110 A1 * | 11/2007 | Oz et al. .......................... 726/11 |

FOREIGN PATENT DOCUMENTS

CN    1748395 A    3/2006

OTHER PUBLICATIONS

Wool-A,The use and usability of direction-based filtering in firewalls,2004,Elsevier, UK.vol. 23, No. 6, p. 459-68.*
English language translation of office Action received in a counterpart China application No. 2006101563343 dated Dec. 25, 2009.

* cited by examiner

Primary Examiner — Taghi Arani
Assistant Examiner — Amir Mehrmanesh

(57) ABSTRACT

The present invention provides a firewall device that is divided into several virtual firewalls. The users in the Intranet are divided into several user groups based on different security policy demands. Each virtual firewall is equipped with the security policy of the corresponding user group. Each firewall manages one user group in the Intranet. Thus, the present invention reduces the complexity of the firewall management, reduces the extra cost of adding more firewalls and makes the management easier.

5 Claims, 2 Drawing Sheets

VIRTUAL FIREWALL

FIELD OF THE INVENTION

The present invention relates to network access control, and especially relates to a firewall and a method of network access controlling.

BACKGROUND ART

A firewall is a network security device placed between networks to logically separate and protect the privacy and integrity of business communications across these networks, and to safeguard against malicious use. Firewalls are positioned between a corporate private network (trusted network) and other public networks, and monitor and enforce corporate policies on all the communication flowing in and out of the corporate network.

Conventional firewalls performed the basic function of controlling access to communication occurring between an enterprise network and the outside world. However, next generation firewalls have significantly increased security capabilities. One very essential function is of preventing Denial-of-service (DoS) and Distributed DoS attacks. Denial-of-service is when a hacker or malicious user programmatically probes the Intranet to gain access to a private network, and then proceeds to use this information to further repeatedly scan and install disruptive tools. This leads to the network being compromised and steals considerable processing capabilities of the network, resulting in disrupting service and rendering the network unavailable to customers for large lengths of time.

A simple firewall configuration consists of a box with 3 ports—one port connecting to the network that requires the firewall, another to the Internet, and the third port to DMZ networks providing useful public utilities such as HTTP and FTP.

Firewalls can be standalone or installed as an integrated gateway solution. Standalone firewalls require significant administration effort and are a less-preferred solution, keeping in mind the increasing network complexity and rising security needs. Enterprises and small businesses increasingly prefer routers and gateways with built-in firewalls with widely acceptable technologies like Stateful Packet Inspection (SPI). Stateful Packet Inspection provides the highest level of security by extracting the state-related information required for security decisions from all application layers and maintaining this information in dynamic state tables. This information is then used for evaluating further action on packets of the same session.

Multi Tenant Units (MTUs) or commercial office buildings, campuses, hotels and multi-family apartment buildings, present a large market opportunity for service providers to gain new customers through the provision of secure connections. Existing local exchange carriers currently underserve the MTU/MDU customer base. Small businesses and home offices need cost-effective and reliable networking solutions. Moreover, the solutions need to be easy to install and use, and scalable to accommodate changes as the business grows. Effective firewalls with advanced security are essential to protect confidential information and to maintain quality of service.

Next generation firewalls will need to actively support extension of security support and collaboration for selective user communities within an enterprise. An enterprise consists of a collection of individuals with separate functions and responsibilities, requiring disparate access control. Different divisions of an enterprise may need to maintain separate networks, requiring some collaboration but limiting the access privileges across the entire enterprise.

The increasing need for enterprises and businesses to scale—to add users and user communities and separate network entities with their own governing security policies—will require the management of firewall security by duplicating indefinite numbers of firewall boxes, one for each additional network. Technology solutions that can provide an aggregation of firewalls in one box would be more practical and easy to maintain.

A Virtual Firewall System (VFS) provides multiple logical firewalls for multiple networks, on one system. That is, a service provider with numerous subscribers can provide firewalls separating and securing all the subscribers and yet, is able to manage it from one system. This is accomplished by establishing "security domains" controlled by Virtual Firewalls, with each firewall having its own defined security policy. Security domains are exclusive in that they are external to any other security domain in a given system.

Virtual Firewalls are functionally similar to a simple firewall, and are configured with their own outbound and inbound policies, and network objects. However, Virtual Firewalls enable easy management of a collection of firewalls through policies at a defined security domain. In addition, VFS (Virtual Firewall System) allows additions and removal of security domains, providing scalability with the growth of subscriber networks.

SUMMARY OF THE INVENTION

One embodiment of the present invention provides a firewall device that is divided into several virtual firewalls. Each virtual firewall is equipped with a security policy. When the firewall device receives a package that is intended to visit another network, the firewall will deliver the package based on the information of the package. The information comprises IP address, destination address or the network interfaces. Then the package will be delivered into the corresponding virtual firewall. The virtual firewall checks the package based on the pre-defined security policy. If the package fits the security policy, the virtual firewall will allow the package. Thus, the firewall device allows the visit demand. If the package does not fit the security policy, the virtual firewall will discard the package. Thus, the firewall device forbids the visit demand.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "storing," "establishing," and "enabling," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 1:
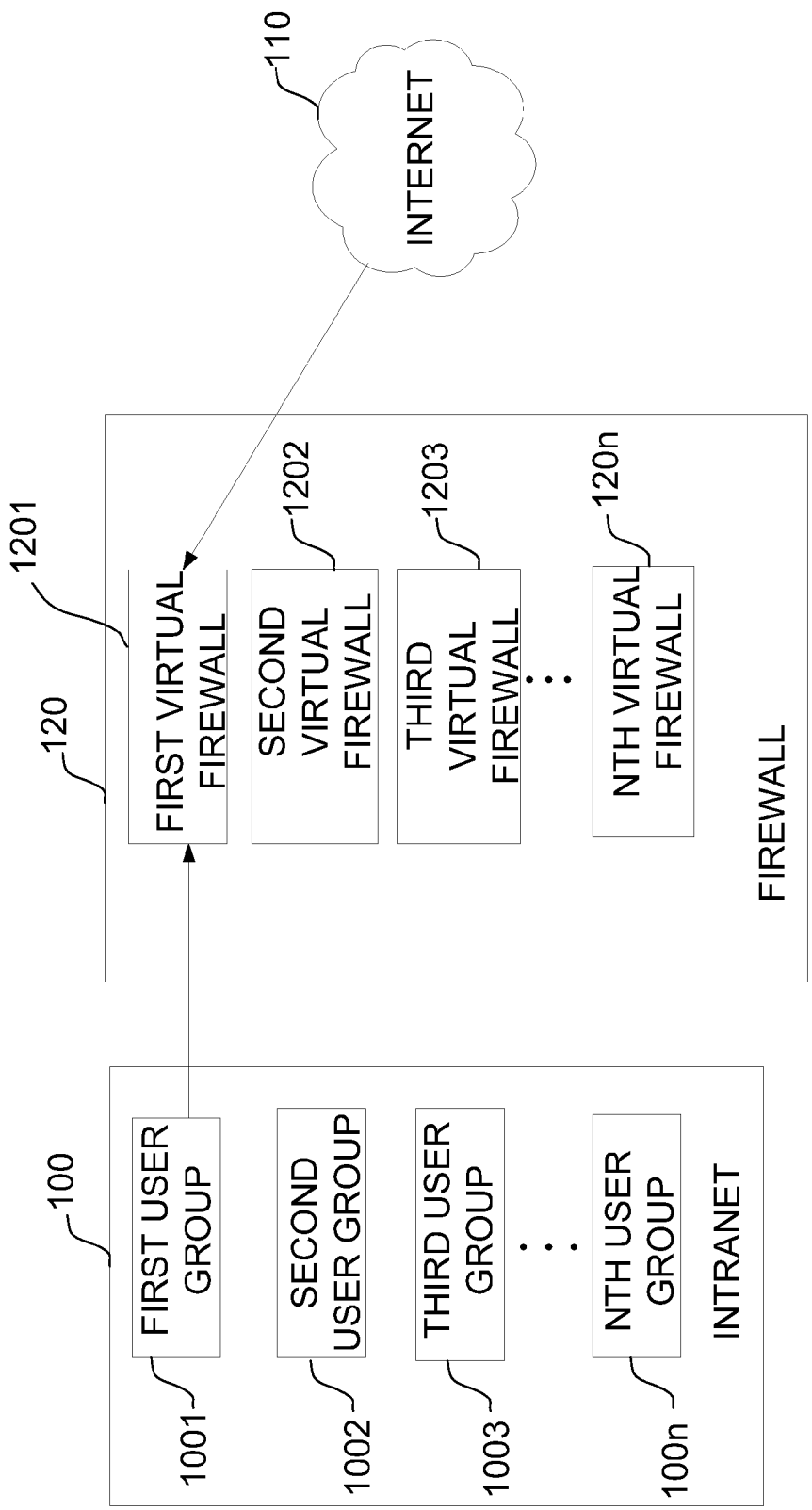
FIG. 1 illustrates a system diagram of a network system which realizes network access control using a virtual firewall, in accordance with one embodiment of the present invention.

FIG. 1 illustrates a system diagram of a network system which realizes network access control using a virtual firewall, in accordance with one embodiment of the present invention. The system comprises an Intranet 100, an Internet 110, and a firewall device system 120 which is located between the Intranet 100 and the Internet 110. The firewall device system 120 is an isolated device or a device comprising a router, gateway, or the like which functions like a firewall device. Based on the security policy setting, users having the same security policy are divided into one user group. In one embodiment of the present invention, the Intranet 100 is an inside network of the enterprise. The users in the Intranet 100 are divided into N user groups 1001, 1002, 1003 ... 100n. The firewall device 120 provides a plurality of virtual firewalls based on logic to realize several security domains. The number of the virtual firewalls can be set based on the demands from users in the Intranet 100. In one embodiment of the present invention, the firewall device 120 is divided into virtual firewalls 1201, 1202, 1203 ... 120n. Each virtual firewall is equipped with a security policy to manage the corresponding user group 1001, 1002, 1003 ... 100n.

In one embodiment of the present invention, the first user group 1001 which is one of the N user groups in the Intranet 100 can be any kind of server group in the enterprise, such as but not limited to a mail server, web server, or the like. The second user group 1002 that is one of the N user groups in the Intranet 100 can be a finance and marketing group. The third user group 1003 that is one of the N user groups in the Intranet 100 can be an R&D and quality group. Each virtual firewall is equipped with a security policy, comprising an outside security policy and inside security policy, to manage corresponding user groups. For example, the first virtual firewall 1201 manages the first user group 1001, the second virtual firewall 1202 manages the second user group 1002, and the third group 1203 manages the third user group 1003.

The users in the Intranet 100 are divided into N user groups based on the security policy. In this way, the information flows in the Intranet 100 are categorized according to different characteristics. Each information flow group is managed by a virtual firewall. So that one virtual firewall manages one information flow group, that is one virtual firewall manages one user group, the virtual firewall 120 can be divided based on user IP address. Through setting the virtual firewall 120 based on IP address, which is a logic method, each virtual firewall manages users in a certain range of IP address. For example, the first virtual firewall 1201 manages the first user group 1001 in a certain range of IP address.

In another embodiment of the present invention, the users can be divided based on network interfaces, which is based on a physical method, in this way each virtual firewall manages the information flow from one network interface. The firewall device 120 provides a plurality of network interfaces. Each user group connects to the corresponding network interface. The users in one user group are connected to one exchanger, and then the exchanger connects to the network interface of the firewall device 120. When there is only one computer in one user group, there is no need for the user group to connect to an exchanger. The user group can be connected to the firewall device 120 directly.

Operation can be based on network interface (physical method) or IP address (logical method) to divide the information flow (access flow) in the Intranet 100. Generally, a network interface setting method is suitable for the users who have a fixable physical location, such as the first user group 1001 comprising a web server, mail server, or the like.

Alternatively, an IP address setting method is suitable for the users who must work in a mobile environment, such as the second user group 1002 comprising a finance and marketing group. Since the users in a finance and marketing group always work outside the enterprise, if these groups are divided by network interface setting method, it will cause extra cost to reset the network interfaces for the users. Because the users in a finance and marketing group work outside the enterprise, their network interfaces changes and must be reset. It will cause extra cost and complexity to reset the network interfaces. It is recommended using the IP address to divide the users in the user groups that may work in an uncertain location. Wherever the users go, as long as the IP address is not changed, the virtual firewall that manages the users will not be changed.

The firewall device 120 setting needs information of the user groups, such as the IP address or the network interface of the users, to make a virtual firewall to manage each user group.

Figure 2:
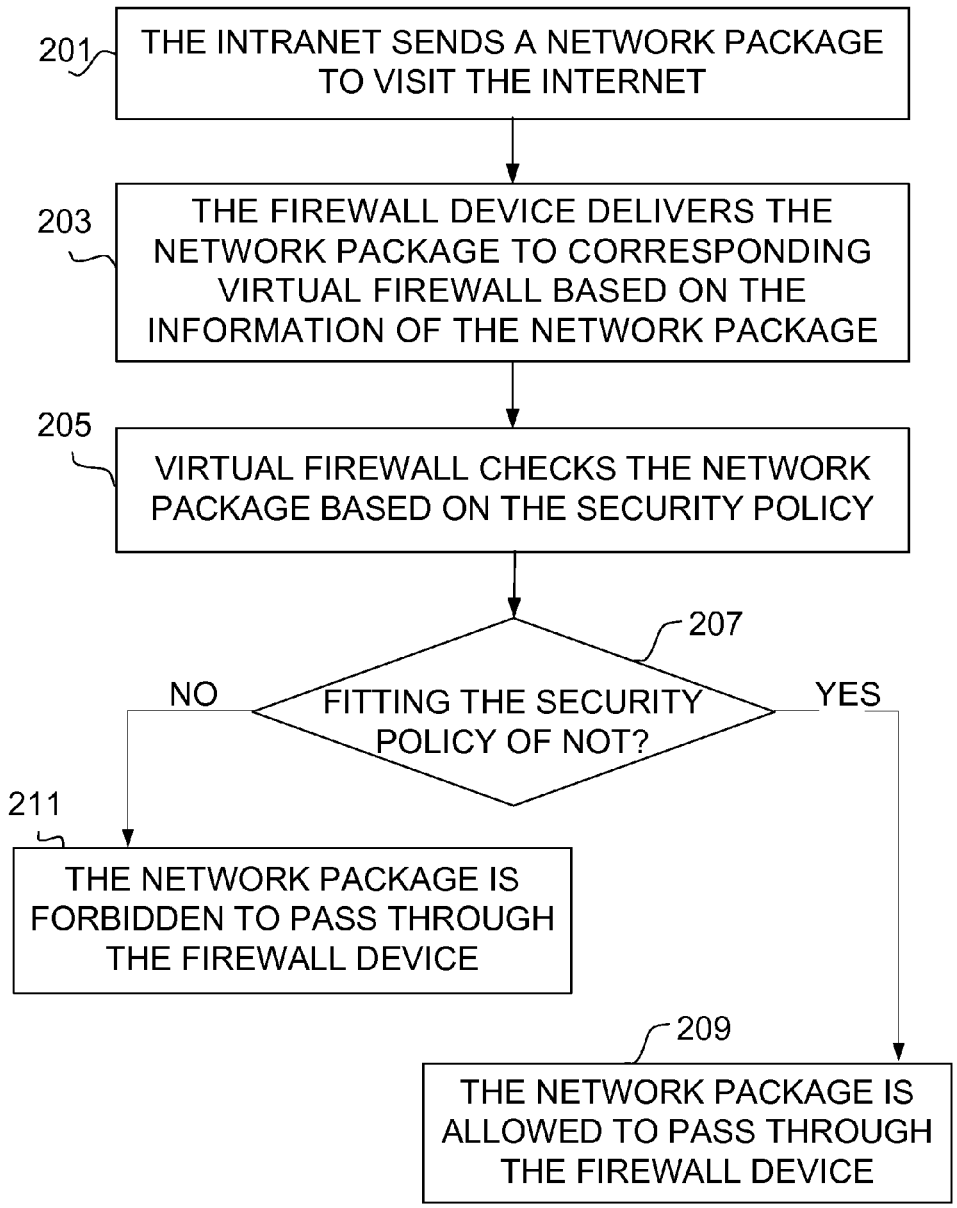
FIG. 2 illustrates a flow chart of the operation of the network system, in accordance with one embodiment of the present invention.

According to FIG. 1 and FIG. 2, when the Intranet 100 communicates with the Internet 110, in operation 201, the Intranet 100 sends a network package to inform the Internet 110 that the Intranet 100 wants to visit the Internet 110. For example, the network package is from a user in the second user group 1002, which is the finance and marketing user group.

In operation 203, according to the information from the network package, such as the IP address or network interface information, the firewall device 120 finds the corresponding virtual firewall. For example, the firewall device 120 will find the second virtual firewall 1202 corresponding to the second user group 1002. Thus, the network package will be sent to the second virtual firewall 1202. The second virtual firewall 1202 comprises the security policy that is defined according to the second user group 1002.

In operation 205, according to the corresponding virtual firewall, such as the second virtual firewall 1202, the predefined security policy checks the network package sent from the second user group 1002.

In operation 207, the security policy checks whether the network package fits the security policy of the corresponding virtual firewall or not, such as the security policy of the second virtual firewall 1202. If the network package fits the security policy of the corresponding virtual firewall 1202, in operation 209, the network package will be allowed to deliver through the virtual firewall 1202. In this way, the communication between the Intranet 100 and the Internet 110 is realized. If the network package does not fit one of the security policies of the corresponding virtual firewall 1202, in operation 211, the network package will be discarded. The network package is forbidden to deliver through the virtual firewall. The package is filtered and the user who sent out the package is not authorized to visit the Internet 110.

When the Internet 110 wants to visit the Intranet 100, for example, the Internet 100 wants to visit the user in the first user group 1001, the Internet 110 sends out a network package to the Intranet 100. The firewall device 120 finds the corresponding virtual firewall based on the destination address of the network package, for example the first virtual firewall 1201 corresponding to the first user group 1001. Then, the network package will be delivered to the first virtual firewall 1201. The first virtual firewall checks the received network package based on the pre-defined security policy. If the network package fits the security policy of the corresponding virtual firewall 1201, the network package will be allowed to deliver through the virtual firewall 1201. In this way, the communication between the Internet 110 and the Intranet 100 is realized. If the network package does not fit one of the security policies of the corresponding virtual firewall 1201, the network package will be discarded. The network package is forbidden to deliver trough the firewall device 120. The Internet 110 is forbidden to visit the Intranet 100.

Generally, the Internet 110 is forbidden to visit other groups except the first group that is composed of web server, mail server, or the like. When the firewall device 120 receives a network package from the Internet 100, the firewall device 120 will check the destination address of the network package. If the destination address of the network package is not the first user group 1001, the package will be filtered. Thus, the Internet 100 is forbidden to visit the Intranet 100.

According to the present invention, the Intranet 100 is divided into different security domains (user groups). Each security domain has the same security policy demands. The firewall device 120 is divided into several virtual firewalls based on the logical or physical method. Each virtual firewall is equipped with the IP address and security policy for the corresponding user groups. That is, the information flows in the Intranet are cataloged based on different characteristics. Each information flow is managed by corresponding virtual firewall.

When the Intranet 100 sends a network package, the firewall device 120 will choose to deliver it into the corresponding virtual firewall based on the information of the network package, such as IP address or network interfaces. Then the virtual firewall executes the corresponding outside security policy. When the Internet 110 sends a network package, the firewall device 120 will choose to deliver it into the corresponding virtual firewall based on the information of the network package, such as destination address or network interfaces. Then the virtual firewall executes the corresponding inside security policy. Therefore, the present invention makes the information flow delivering into different corresponding virtual firewall dividedly, thus enhances the efficiency of the firewall device, reduces the complexity of the setting and reduces the decreases the difficulty of the management.

For easy management, the firewall device 120 sets an administrator for each virtual firewall. Each administrator has their own key and password. Each administrator manages a corresponding virtual firewall. Thus, the workload of the management is reduced. When the network has problems, only the corresponding virtual firewall is checked. Thus, the complexity of the management is reduced. According to the increase or decrease of the user groups, the virtual firewall can be increased or decreased. Thus, the flexibility of the management is realized. Further, dividing the firewall device into a plurality of virtual firewalls is much cheaper than adding more firewalls. Thus, the cost decrease is realized.

The terms and expressions that have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

The invention claimed is:

1. A method comprising:
dividing a firewall into a plurality of virtual firewalls based on a plurality of network address ranges;
dividing a plurality of users into a plurality of user groups in a first network based on a plurality of security policies; assigning each of said network address ranges to one of said user groups such that each of said virtual firewalls manages a respective user group and equips a security policy corresponding to said respective user group;
accessing a first packet from a user group in said first network;
checking a first network address associated with said first packet;
identifying a corresponding virtual firewall associated with said user group according to said first network address;
delivering said first packet to said corresponding virtual firewall;
checking said first packet based on said security policy of said corresponding virtual firewall;
sending said first packet to a second network if said first packet complies with said security policy;
discarding said first packet if said first packet violates said security policy;
accessing a second packet from said second network;
delivering said second packet to one of said virtual firewalls according to a second network address associated with said second packet;
sending said second packet to said first network if said second packet complies with said security policy of said one of said virtual firewalls;
discarding said second packet if said second packet violates said security policy; and
filtering said second packet if said second network address is outside the group consisting of a web server and a mail server.

2. The method of claim 1, wherein said first network is an Intranet and said second network is the Internet.

3. A non-transitory computer-readable storage medium having instructions stored thereon, wherein said instructions when executed cause said computer system to perform a method comprising:
receiving a first packet from one of a plurality of user groups grouped based on a plurality of security policies;
determining a corresponding virtual firewall associated with said user group from a plurality of virtual firewalls based on a first network address associated with said first packet, wherein said virtual firewalls are divided from a firewall based on a plurality of network address ranges, and wherein each of said user groups is assigned to a network address range of said network address ranges such that each of said virtual firewalls manages a respective user group and equips a security policy corresponding to said respective user group;
providing said first packet to said corresponding virtual firewall;
checking said first packet based on said security policy of said corresponding virtual firewall;

accessing a second packet from a second network;

delivering said second packet to one of said virtual firewalls according to a second network address associated with said second packet;

checking said second packet based on said security policy of said one of said virtual firewalls;

sending said second packet to said first network if said second packet complies with said security policy;

discarding said second packet if said second packet violates said security policy; and filtering said second packet if said second network address is outside the group consisting of a web server and a mail server.

4. The non-transitory computer-readable storage medium of claim 3, wherein said method further comprises:

sending said first packet to a second network if said first packet complies with said security policy; and discarding said first packet if said first packet violates said security policy.

5. The non-transitory computer-readable storage medium of claim 3, wherein said security policy comprises a first security policy and a second security policy, and wherein said first packet is checked based on said first security policy and said second packet is checked based on said second security policy.

* * * * *

UNITED STATES PATENT AND TRADEMARK OFFICE
CERTIFICATE OF CORRECTION

| | | |
|---|---|---|
| PATENT NO. | : 8,127,347 B2 | Page 1 of 1 |
| APPLICATION NO. | : 11/648097 | |
| DATED | : February 28, 2012 | |
| INVENTOR(S) | : Xiao | |

It is certified that error appears in the above-identified patent and that said Letters Patent is hereby corrected as shown below:

Title Page, Item (73) "Assignee", in Column 1, Line 1, delete "02Micro" and insert -- O2Micro --.

Signed and Sealed this
Second Day of October, 2012

David J. Kappos
*Director of the United States Patent and Trademark Office*